United States Patent [19]

Smith, III

[11] Patent Number: 5,444,552
[45] Date of Patent: Aug. 22, 1995

[54] METHOD FOR COMPRESSING, PROCESSING, AND STORING GRAYSCALE BITMAPS

[75] Inventor: Z. Erol Smith, III, Palo Alto, Calif.

[73] Assignee: Xerox Corporation, Stamford, Conn.

[21] Appl. No.: 951,961

[22] Filed: Sep. 28, 1992

[51] Int. Cl.⁶ .............................................. H04N 1/40
[52] U.S. Cl. .................................. 358/465; 358/534; 358/462
[58] Field of Search ................. 358/465, 52, 280, 284, 358/282, 283, 298, 296, 456, 455, 133, 135, 80, 75, 76; 340/723, 731, 734, 750, 728, 735, 748, 747; 364/521, 519, 518; 395/109, 101; 382/54, 56, 42.6, 51; 346/108, 154

[56] References Cited

U.S. PATENT DOCUMENTS

| | | | |
|---|---|---|---|
| 4,124,870 | 11/1978 | Schatz et al. | 358/260 |
| 4,251,837 | 2/1981 | Janeway, III | 358/280 |
| 4,295,135 | 10/1981 | Sukonick | 340/734 |
| 4,577,235 | 3/1986 | Kannapell et al. | 358/280 |
| 4,593,325 | 6/1986 | Kannapell et al. | 358/282 |
| 4,731,671 | 3/1988 | Alkofer | 358/284 |
| 4,811,108 | 3/1989 | Numakura et al. | 358/298 |
| 4,833,546 | 5/1989 | Numakura et al. | 358/283 |
| 4,851,825 | 7/1989 | Naiman | 340/728 |
| 4,873,515 | 10/1989 | Dickson et al. | 340/728 |
| 4,924,323 | 5/1990 | Numakura et al. | 358/456 |
| 4,924,521 | 5/1990 | Dinan et al. | 382/54 |
| 4,988,984 | 1/1991 | Gonzalez-Lopez | 340/728 |
| 5,029,108 | 7/1991 | Lung | 364/519 |
| 5,102,333 | 4/1992 | Lee et al. | 358/80 |
| 5,185,852 | 2/1993 | Mayer | 395/109 |
| 5,243,444 | 9/1993 | Fan | 358/456 |
| 5,351,306 | 9/1994 | Finkler et al. | 382/6 |

*Primary Examiner*—Paul Ip
*Attorney, Agent, or Firm*—Oliff & Berridge

[57] ABSTRACT

A method for image processing includes the steps of scanning an image within a first grid of pixels, determining a grayscale value for each pixel scanned in the first grid of pixels, and, for each pixel scanned, activating a number of pixels of a second grid of pixels corresponding to the grayscale value determined. Data representing the second grid of pixels can be compressed, and stored for use in facsimile transmission or photoreprographic image production.

20 Claims, 2 Drawing Sheets

METHOD FOR COMPRESSING, PROCESSING, AND STORING GRAYSCALE BITMAPS

BACKGROUND OF THE INVENTION

1. FIELD OF THE INVENTION

This invention relates to improvements in image processing techniques, and more particularly to an efficient, rapid, lossless method of compressing, processing and storing grayscale bitmaps using algorithms that are designed for binary images.

2. TECHNICAL BACKGROUND

In the field of image processing, particularly in reprographic reproduction of an image or in the facsimile transmission of an image, the need for providing grayscale resolution of the image data is becoming of increased importance. Also, recently, with improvements in microprocessors and microcontrollers, and in digital information handling technologies, image data has been read and stored in digital form for processing.

Thus, typically, digital reprographic and image storage systems use a scanner to convert an input document to digital form. Such scanners, in their simplest form, compare the input image on a pixel-by-pixel basis to a predetermined threshold, such that pixels with brightness below the threshold are mapped to "1" (black) and pixels with brightness above the threshold are mapped to "0" (white). In more sophisticated systems, the scanners are capable of discerning various levels of gray in the image, and have a grayscale output, typically 4, 6, or 8 bits per pixel.

While the extension of binary scanners to images having grayscale values intermediate black and white can be realized with only modest technical and cost differences, the differences are much more substantial between binary output devices, such as displays and hard copy producing apparatuses, and those capable of reproducing gray-levels. This is especially true in such hard copy output devices as laser, ionographic, or inkjet printers. Until recently, most such devices were capable of rendering only binary bitmaps. For this reason, continuous-tone images, such as a photograph would be rendered as binary bitmaps for printing using halftoning techniques. For example, if the original were scanned at 300 spi×4 bit (16 level) gray, the image could be divided into 4 pixel×4 pixel cells, the gray values of the pixels within the cell averaged, and then the 16 pixels in the cell turned on in proportion to the average gray value over the cell; for instance, a gray-level 8 out of 16 would be represented by blacking 8 of the 16 pixels in the cell.

While grayscale hard copy output devices are relatively rare, it has long been known in the bitmap display art that the legibility and apparent image quality of an arbitrarily-shaped image (such as typed characters, lineart, etc.) is improved by the technique of anti-aliasing. Anti-aliasing provides a method of presenting bi-level images on finite-resolution bit-mapped printers or displays with improved image quality by using intermediate graylevels for pixels at the edges of features. More particularly, by this technique, an image can be rendered to a grayscale display of 50 spi×5 levels of gray by calculating what the text or image would look like at 200 spi, grouping pixels into 2×2 cells, counting up the number of pixels which are on, and mapping this to the gray-value of the 50 spi image. When the image to be rendered is not in vector form (such as typed characters or line-art) but rather is already in high-resolution binary bitmap form, this high-resolution binary to low-resolution grayscale rendering is called inverse halftoning.

Now, recently, hardcopy output devices have begun to appear that are capable of reproducing a few levels of gray, rather than just black or white. One example is a copier/fax that has an 8 bit (256 level) scanner and can reproduce 6 levels of gray in its printout. Even if the original image scanned has no regions of intermediate gray, only black marks on white paper, for example, the apparent image reproduction quality is still improved by grayscale printing because the "jaggies" introduced by the finite spatial resolution of the scanner are softened using gray on partially occluded pixels. If the region does have regions of intermediate gray (such as a photograph or the like), these regions are usually better reproduced by halftone techniques than just mapping each pixel into the limited number of printable gray values. Thus, such digital reprographic systems might be thought of as printing anti-aliased images, whether the input image is monochrome or continuous-tone.

A key problem faced by systems such as the digital copier/fax mentioned above is how to efficiently store the scanned images of pages to support fax or electronic collation functionality. While compression techniques such as CCITT Groups 3 or 4 [G3 or G4] are both lossless and efficient for compressing binary images (i.e., the bitmap produced from a thresholded or halftoned scanned image), they are much less efficient at compressing grayscale data. In typical compression techniques, such as in CCITT G4, the most significant bit of the binary word represents the gray-level of each image pixel. However, such techniques do not efficiently compress the less significant bits that are important in grayscale applications. For these, special techniques exist (e.g., JPEG) which tend to be complex, slow, and sometimes lossy. Custom hardware accelerator ASICs for G4 are far more wide-spread and far less expensive than JPEG.

For example, considering a 2-bit gray printing process, when a multipage document is being copied, it is desirable for the compressed bitmap to be stored in system RAM. If gray-level 3 "11" is black and gray-level 0 "00" is white, then the most-significant-bit will look like the old binary image, and will compress well. However, the least-significant-bit will look like the regular image with a white line drawn around character outlines. This LSB bitmap will not compress as well. Thus, storing the 400×2 G3/G4 image takes more than twice the space of the 400×1 (MSB) bit image.

The compressed version of the second most significant bitplane is 2 to 3 times as large as the most significant bit plane because the transition from white to black in the original image, once sampled by the scanner, involves the transition from gray-level 0 (binary 00xxx) to gray-level 1 (binary 01xxx), then 2 (binary 10xxx), then gray-level 3 (binary 1xxx). Thus the most-significant bit is 0, then 0, then 1, then 1, while the 2nd-most significant bit is 0, then 1, then 0, then 1 as the scanner sweeps across the white to black edge. The G4 technique uses 1 Huffman code per transition from pixel-on to pixel-off or vice versa, and the 2nd-most-significant bit map has 3 times as many transitions as the edge is swept across.

Other grayscale compression approaches exist. For example, one approach is the so-called "Gray codes"

(see, for example, Logic Design with Integrated Circuits, William E. Wickes, (John Wiley & Sons, New York, 1968) p. 14). Another approach is described in the JPEG/MPEG standards. Gray codes have the advantage of being lossless, but would not enable standard G4 compressor/decompresor algorithms/chips to be used without special adaptations; JPEG/MPEG are, in general, lossy and often introduce unwanted artifacts in images of fine text.

Techniques for up-conversion of low-resolution gray to high-resolution binary are also known, and used in products of the Xerox Corporation, like the Docutech or the 7650 scanner, in which the scanner actually scans at 400 spi gray and interpolates to 600 spi binary.

Reference is also made to K. Y. Wong and B. Schatz, in Graphical and Binary Image Processing and Applications, J. C. Stoffel, ed., (Artech House, Dedham Mass., 1982); B. R. Schatz and K. Y. Wong, "Method for improving print quality of coarse-scan/fine-print character reproduction," U.S. Pat. No. 4,124,870, Issued Nov. 7, 1978, assigned to the assignee hereof.

SUMMARY OF THE INVENTION

In light of the above, it is an object of the invention to provide an efficient, rapid, lossless method for compressing, processing, and storing grayscale bitmaps using algorithms that are designed for binary images.

It is another object of the invention to provide an improved technique for enabling the efficient compression of the less significant bits in grayscale bitmap applications.

It is another object of the invention to provide an improved method for compressing successive bit-planes when operating on anti-aliased images, particularly in facsimile and reprographic applications.

It is another object of the invention to provide a lossless means for storing grayscale bit maps using compression algorithms which are typically used for binary images, such as G3 or G4.

It is yet another object of the invention to provide a method for transmitting data or storing data that requires essentially half the transmission time or memory space than prior data storing and transmitting techniques.

These and other objects, features, and advantages will become apparent to those skilled in the art from the following detailed description when read in conjunction with the accompanying drawings and appended claims.

In accordance with a broad aspect of the invention, a method for image processing is presented that includes the steps of scanning an image within a first grid of pixels, determining a grayscale value for each pixel scanned in the first grid of pixels, and, for each pixel scanned, activating a number of pixels of a second grid of pixels corresponding to the grayscale value determined.

Data representing the second grid of pixels can be compressed, and stored for use in facsimile transmission or reprographic image production.

In accordance with another broad aspect of the invention, a method is presented for image processing. The method includes scanning an image to produce a digital representation of the image at a first resolution and with a predetermined number of grayscale values. The digital representation of the image is converted to a digital representation of an image having an increased resolution at least as great as the first resolution times the base-2 logarithm of a predetermined number of grayscale values, and having only 2 grayscale values. The converted digital representation is then compressed and stored. The stored data can be used in facsimile transmission or reprographic image production.

BRIEF DESCRIPTION OF THE DRAWING

The invention is illustrated in the accompanying drawing, in which.

DESCRIPTION OF THE PREFERRED EMBODIMENTS

Figure 1:
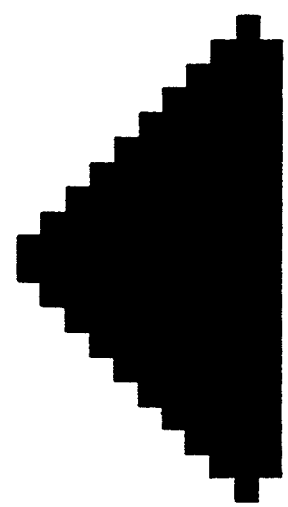
FIG. 1 is a diagram of four grayscale values and their binary representations in forming grayscale images thereof.
Figure 2:
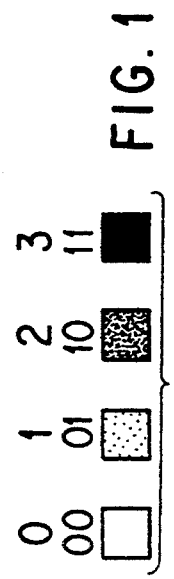
FIG. 2 is an image having the four grayscale values of FIG. 1 that is desired to be stored and processed.

As will become apparent, the invention is particularly useful in processing an image that has multiple grayscale values. An arbitrary image having the four grayscale values shown in FIG. 1 is depicted in FIG. 2. The image of FIG. 2 is depicted as it might be processed by a scanner or other device known in the art, and is partitioned into pixels 12, each of which having a particular grayscale value.

The four grayscale values shown in FIG. 1 are numbered 0-3, representing increasing levels of black from white. Thus, the first level 0 is white, and, when mapped to a two-bit binary value, has a grayscale value of "00". The black level maps to the two-bit binary value "11", and the two intermediate gray-levels map to binary values "01" and "10". Of course, any number of grayscale values can be defined, four being described as being merely exemplary.

Figure 3A:
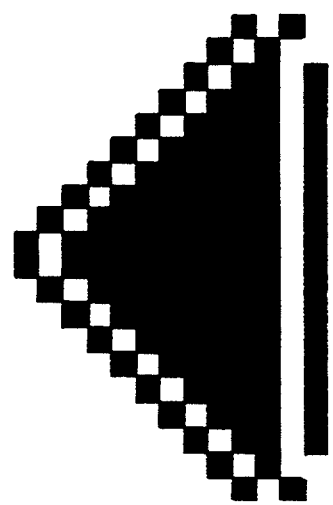
FIG. 3A is a binary image produced using the least significant bit values of the grayscale values of the image of FIG. 2, using prior art techniques.
Figure 3B:
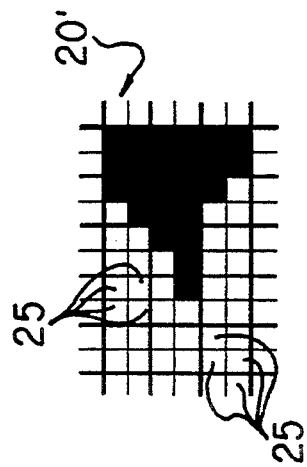
FIG. 3B is a binary image produced using the most significant bit values of the grayscale values of the image of FIG. 2, using prior art techniques.

As mentioned above, in the past, one technique that has been employed in the processing of an image such as that of FIG. 2 has been to generate a plurality of bit planes, each comprising the values at respective bit levels of grayscale information. Thus, in accordance with the prior art, as shown in FIGS. 3A and 3B, the image of FIG. 2 would be mapped into the respective least significant bit plane shown in FIG. 3A and most significant bit plane shown in FIG. 3B. It is noted that the least significant bit map of FIG. 3A has a "ghost halo" surrounding the image, and that the black values and an intermediate gray value map to the same black level. The combination of the bit maps of FIGS. 3A and 3B do not compress efficiently, using standard image compression techniques such as CCITT techniques G3 and G4.

On the other hand, the present invention provides a novel, substantially lossless method for storing grayscale bitmaps using compression algorithms that are normally used for binary images, such as G4. In the case of G4, it is twice as efficient as the technique of compressing successive bit-planes (i.e., the binary bitmaps of the most-significant bit, next-most-significant bit, etc.) when operating on anti-aliased images. This halving of memory requirements maps to halving the telephone charges for facsimile transmissions or halving the required RAM or disk space for digital copiers or image storage systems.

Figure 4A:
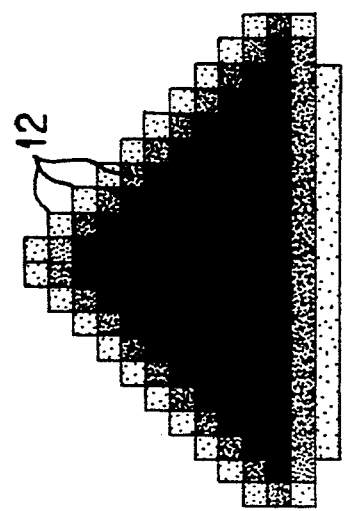
FIG. 4A is a grayscale image having a resolution of 400 spi×2 bits (4 grayscale levels), that is desired to be stored and processed.
Figure 4B:
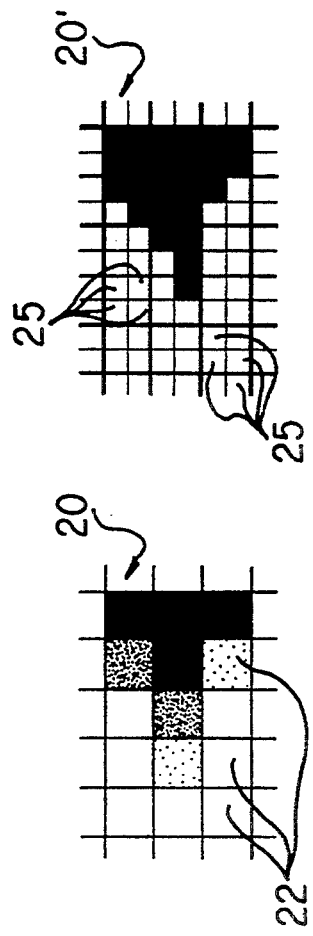
FIG. 4B is a binary image formed of the image of FIG. 4A, having a resolution of 800 spi×1 bit (2 grayscale levels), produced in accordance with the method of the invention.

With reference now to FIGS. 4A and 4B, an image 20 to be processed is shown in FIG. 4A. Again, the image is an arbitrary image, and, in the embodiment illustrated, has four grayscale levels as defined in FIG. 1, but any number of grayscale values could be employed. The pixels 22 of the image 20 have a resolution of, for example, 400 spi. Thus, the resolution of the image 20 of FIG. 4A is referred to herein as 400 spi×2, representing, therefore, a resolution of 400 spi having four grayscale levels.

Figure 5:
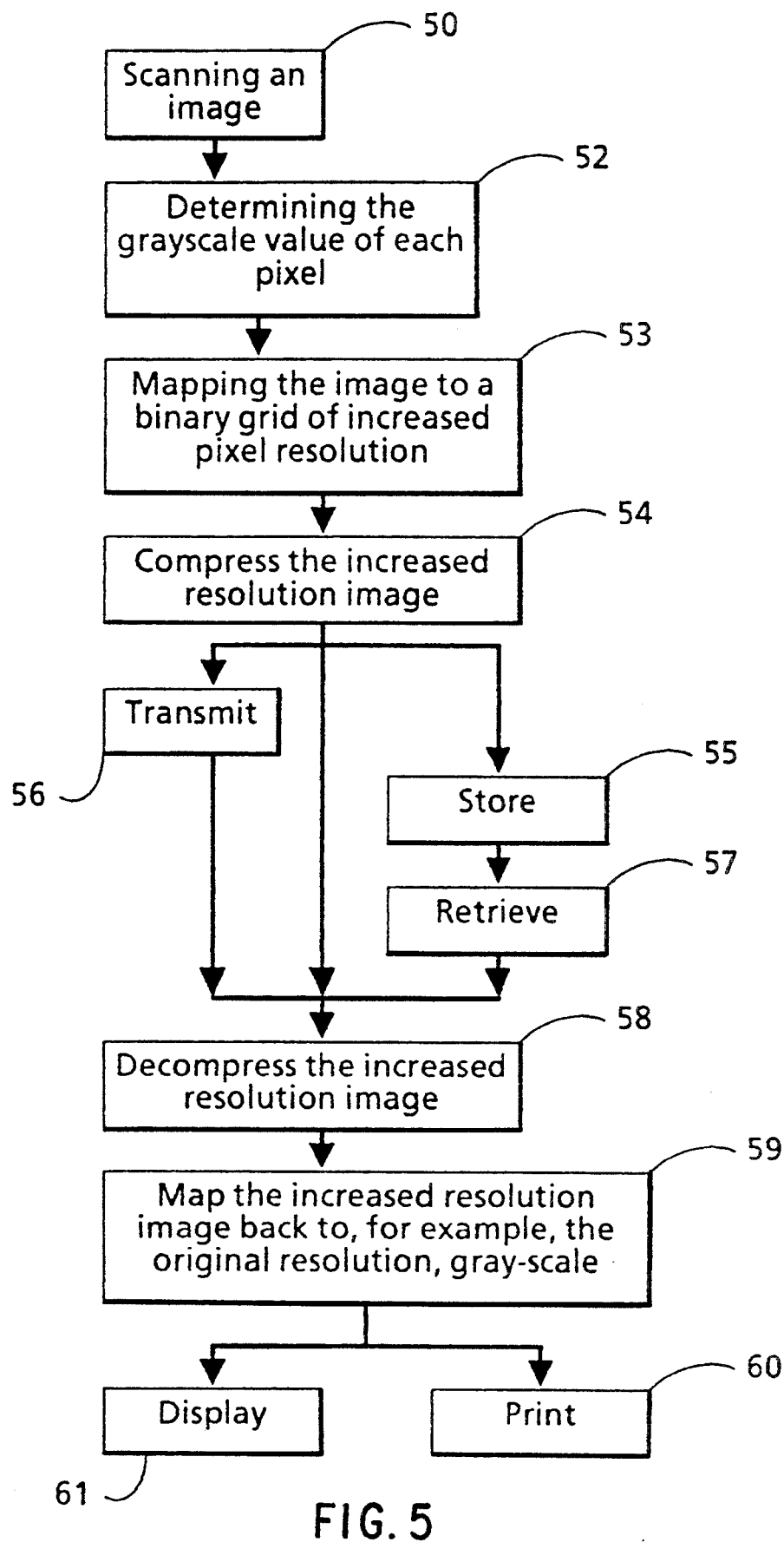
FIG. 5 is a block diagram illustrating the steps of processing a grayscale image in accordance with the invention.

In accordance with the invention, as explained in conjunction with the flow chart of FIG. 5, the image 20 is scanned (Step 50). The grayscale value of each pixel is determined (Step 52). Then, the image 20 is mapped onto a binary grid of increased resolution (Step 53), to produce an image 20' as that shown in FIG. 4B. The image 20' of increased resolution, in the embodiment shown, is twice that of the image 20 of FIG. 4A. Thus, for each pixel 22 of the image 20 of FIG. 4A, four pixel portions 25 of the image 20' exist.

As each of the pixels 22 of the image 20 of FIG. 4A is mapped to the grid of higher resolution to form the image 20' of FIG. 4B, the binary values of each of the pixels 22 of the image 20 are used to determine the number of pixels in the image 20' that are blackened. Thus, for example, a black image having a two bit binary value of 11 is represented by all four pixel portions of the image of increased resolution 20' being blackened. A graylevel having a two bit binary grayscale value of "10" maps to three of the four pixel portions of the image of increased resolution being blackened. A grayscale level having a two bit binary grayscale value of "01" is mapped to blacken only one of the four pixel portions of the image 20' of increased resolution. A grayscale value of white, represented by the two bit binary number "00" maps to no pixel portions of the grid of FIG. 4B being blackened. It will be appreciated that although a two bit binary value representing four grayscale values has been illustrated in FIGS. 4A and 4B, any number of grayscale values can be mapped to a higher resolution grid. In such case, the mapping requires that each pixel of the original image map to a number of pixel portions that correspond to or are larger than the number of grayscale levels in the original image.

Thus, the image 20' of increased resolution as a binary image that can easily be compressed (Step 54) using standard CCITT techniques such as G3 or G4, or other compression technique. The compressed image can then be stored (Step 55) for subsequent use, such as to produce reprographic copies or facsimile transmission, or the like, or immediately transmitted (Step 56) for decompression (Step 58) and processing (Step 59). In the stored image case, the stored image merely needs to be retrieved (Step 57) and decompressed (Step 58) and processed (Step 59), as desired.

When the image is to be decompressed, for example, an 800 spi image can be decompressed 2 lines at a time, grouped into 2×2 cells. The printer gray-level is then established by mapping the counted density in the cell (5 possible levels for a 2×2 cell) into the printable levels (4 in the embodiment illustrated).

More particularly, in a system having a 400 spi scanner whose output is used to compose a 400 spi×2 bit anti-aliased image for processing, the image can be stored most efficiently in memory for reproduction, facsimile, or network transmission by first up-converting it to 800 spi×1 and then compressing it, using, for example a G4 technique. If the image is to be printed, for example, as a part of a reprographic process, the higher resolution image can be retrieved from memory, decompressed and inverse halftoned down to the print resolution of the particular machine employed. Or, for example, if the image is to be transmitted via facsimile, the compressed image can be retrieved from memory, transmitted, then decompressed for display or hard copy generation.

The method of the invention, furthermore, can be used to enhance the image reproduction capabilities of reprographic machines that have different resolution scanning and copy or printing reproduction capabilities. For example, if a particular hard copy device has a scanning and reproduction resolution of 400×3, a digital representation of the image can be converted to a higher resolution, for instance of 1200×1. If another copier, or printer, has, for instance, a different resolution, such as 600×1, then interchange from the lower (400, gray) to higher (600, binary) resolution machine can be made by decompressing the intermediate (1200) very-high-resolution image with every other pixel and every other line used to compose the 600×1 image for the higher resolution machine, thereby introducing minimal image distortion.

It will be appreciated that the method of the invention is not limited to reprographic or facsimile systems. It is useful wherever images are intended to be rendered on a grayscale output device, such as a grayscale display of an image-retrieval system, or the like.

It will be also appreciated that the technique of the invention is most efficient for anti-aliased images, that is, images where gray valued pixels are only found in the sweep between black and white. This technique would not be as efficient if the region were, say, uniformly at gray-level 2 (binary "01") out of 4 grayscale levels.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for image processing a grayscale image, comprising:

scanning an image and mapping the image within a first grid of pixels at a predetermined resolution;

determining a grayscale value for each pixel scanned in said first grid of pixels; and mapping the scanned image onto a binary second grid of pixels of increased resolution, wherein for each pixel within said first mapped grid of pixels, a number of pixels of said second grid of pixels are activated corresponding to said grayscale value determined forming a one-bit bitmap that can be efficiently compressed.

2. The method of claim 1 wherein said first grid of pixels represents an image of first resolution, and said second grid of pixels represents an image of second resolution at least as large as the resolution represented by the first grid of pixels times a base-2 logarithm of the number of grayscale values that can be detected in said first grid.

3. The method of claim 2 wherein the resolution of said first grid of pixels is 400 spi, and the number of grayscale values is 4, and wherein the resolution of said second grid of pixels is 800 spi, and the number of grayscale values is 2.

4. The method of claim 3 wherein the 2 grayscale values of the second grid of pixels are black and white.

5. The method of claim 1 further comprising compressing the second grid of pixels to form a compressed converted binary image representation, and storing the compressed converted binary representation in a memory.

6. The method of claim 5 wherein said compressing is performed using a CCITT Group 3 or 4 compression technique.

7. A method for image processing a grayscale image, comprising:
scanning an image to produce a multiple-bit binary representation of said image at a first resolution and with a predetermined number of grayscale values;
converting the multiple-bit binary representation of said image to a one-bit binary representation of the image having an increased resolution at least as great as the first resolution times a base-2 logarithm of the predetermined number of grayscale values; and
compressing the converted binary representation.

8. The method of claim 7 further comprising transmitting the compressed converted binary representation as a part of a facsimile data transmission.

9. The method of claim 8 further comprising receiving the transmitted compressed converted binary representation, decompressing the received compressed converted binary representation, and reproducing the grayscale image from the decompressed binary representation.

10. The method of claim 7 further comprising decompressing the compressed converted binary representation, and reprographically reproducing the grayscale image from the decompressed binary representation.

11. The method of claim 10 further comprising performing an inverse half-tone process on the decompressed binary representation.

12. The method of claim 7 wherein the first resolution is 400 spi and the predetermined number of grayscale values is 4, and wherein the increased resolution is 800 spi.

13. The method of claim 7 further comprising the step of storing the compressed converted binary representation.

14. The method of claim 7 wherein said compressing is performed using a CCITT Group 3 or 4 compression technique.

15. A method for compressing binary image data having a plurality of grayscale values, comprising:
scanning an image and mapping the image to a multiple-bit binary bitmap at a first resolution;
converting the image data from the first resolution to a one-bit binary representation of the image having an increased resolution at least as great as the first resolution times the predetermined number of grayscale values;
compressing the one-bit binary representation;
decompressing the compressed representation;
and determining the grayscale values of the decompressed converted binary representation from the most significant bits of the image data.

16. The method of claim 15 wherein the binary image data has a resolution is 400 spi and 4 grayscale values, and wherein the converted binary representation has an increased resolution of 800 spi.

17. The method of claim 15 wherein said compressing is performed using a CCITT Group 3 or 4 compression technique.

18. A method for making grayscale copies with a reduced compression storage requirement, comprising:
scanning an image to produce a binary representation of said image at a first resolution and with a predetermined number of grayscale values;
converting the binary representation of said image to a one-bit binary representation of the image having an increased resolution at least as great as the first resolution times a base-2 logarithm of the predetermined number of grayscale values;
compressing the converted binary representation;
storing the compressed converted binary representation;
decompressing the compressed converted binary representation;
and reprographically reproducing the image from the decompressed binary representation.

19. The method of claim 18 wherein the first resolution is 400 spi and the predetermined number of grayscale values is 4, and wherein the increased resolution is 800 spi.

20. The method of claim 18 wherein said compressing is performed using a CCITT Group 3 or 4 compression technique.

* * * * *